United States Patent
Gambetti et al.

(10) Patent No.: US 10,683,929 B2
(45) Date of Patent: Jun. 16, 2020

(54) HYDROSTATIC DRIVE HAVING A CLOSED CIRCUIT AND METHOD FOR OPERATING THE DRIVE

(71) Applicant: THOMAS MAGNETE GMBH, Herdorf (DE)

(72) Inventors: Andrea Gambetti, Rangone (IT); Thassilo Maxeiner, Gemünden (DE)

(73) Assignee: THOMAS MAGNETE GMBH, Herdorf (DE)

( * ) Notice: Subject to any disclaimer, the term of this patent is extended or adjusted under 35 U.S.C. 154(b) by 0 days.

(21) Appl. No.: 16/313,489

(22) PCT Filed: Jun. 16, 2017

(86) PCT No.: PCT/EP2017/000701
§ 371 (c)(1),
(2) Date: Dec. 27, 2018

(87) PCT Pub. No.: WO2018/001547
PCT Pub. Date: Jan. 4, 2018

(65) Prior Publication Data
US 2019/0162302 A1    May 30, 2019

(51) Int. Cl.
*F16H 61/4139*    (2010.01)
*F16H 61/431*    (2010.01)
*F16H 61/433*    (2010.01)

(52) U.S. Cl.
CPC ....... *F16H 61/4139* (2013.01); *F16H 61/431* (2013.01); *F16H 61/433* (2013.01)

(58) Field of Classification Search
CPC ... F16H 61/4139; F16H 61/433; F16H 61/431
See application file for complete search history.

(56) References Cited

U.S. PATENT DOCUMENTS

| | | | | |
|---|---|---|---|---|
| 5,184,466 A | * | 2/1993 | Schniederjan | F16H 61/421 60/448 |
| 6,904,993 B1 | * | 6/2005 | Rinck | B60K 17/356 180/197 |

(Continued)

FOREIGN PATENT DOCUMENTS

| | | | |
|---|---|---|---|
| DE | 102012005824 A1 | 9/2013 | |
| DE | 102013008792 A1 * | 11/2014 | F16H 1/433 |

(Continued)

*Primary Examiner* — Thomas E Lazo
(74) *Attorney, Agent, or Firm* — Nath, Goldberg & Meyer; Joshua B. Goldberg

(57) ABSTRACT

The aim of the invention of for the hydrostatic drive to enable a lowering of the feed pressure provided by the feed pump and, at the same time, to effect a supply of the adjustment unit of the drive that is proper with respect to the pressure and the delivery rate. This aim is achieved in that the adjustment unit (5) of the drive is supplied with hydraulic energy by an electrohydraulic supply unit (6), wherein the supply unit (6) consists of an electric motor (7) and an auxiliary pump (8) coupled thereto and wherein the outlet of the auxiliary pump (8) is connected to the adjustment unit (5) directly or by means of a check valve (18). Hydrostatic drives according to the invention are used, for example, in self-propelled working machines.

20 Claims, 1 Drawing Sheet

(56) References Cited

U.S. PATENT DOCUMENTS

| | | | | |
|---|---|---|---|---|
| 6,915,631 B2* | 7/2005 | Kado | ............... | F16H 61/438 |
| | | | | 60/394 |
| 9,091,040 B2* | 7/2015 | Peterson | ............... | F16H 61/431 |
| 9,574,581 B2* | 2/2017 | Krug-Kussius | ....... | F15B 13/026 |
| 9,772,018 B2* | 9/2017 | Aizawa | ............... | F16H 39/02 |
| 2014/0216024 A1* | 8/2014 | Krug-Kussius | ....... | F15B 13/026 |
| | | | | 60/459 |
| 2016/0116060 A1* | 4/2016 | Schumacher | ....... | F16H 61/4157 |
| | | | | 60/327 |

FOREIGN PATENT DOCUMENTS

| | | |
|---|---|---|
| DE | 102013008792 A1 | 11/2014 |
| EP | 1527939 B2 | 7/2009 |
| EP | 2199622 A2 | 6/2010 |
| EP | 2503195 A1 | 9/2012 |
| FR | 2996270 A1 | 4/2014 |

\* cited by examiner

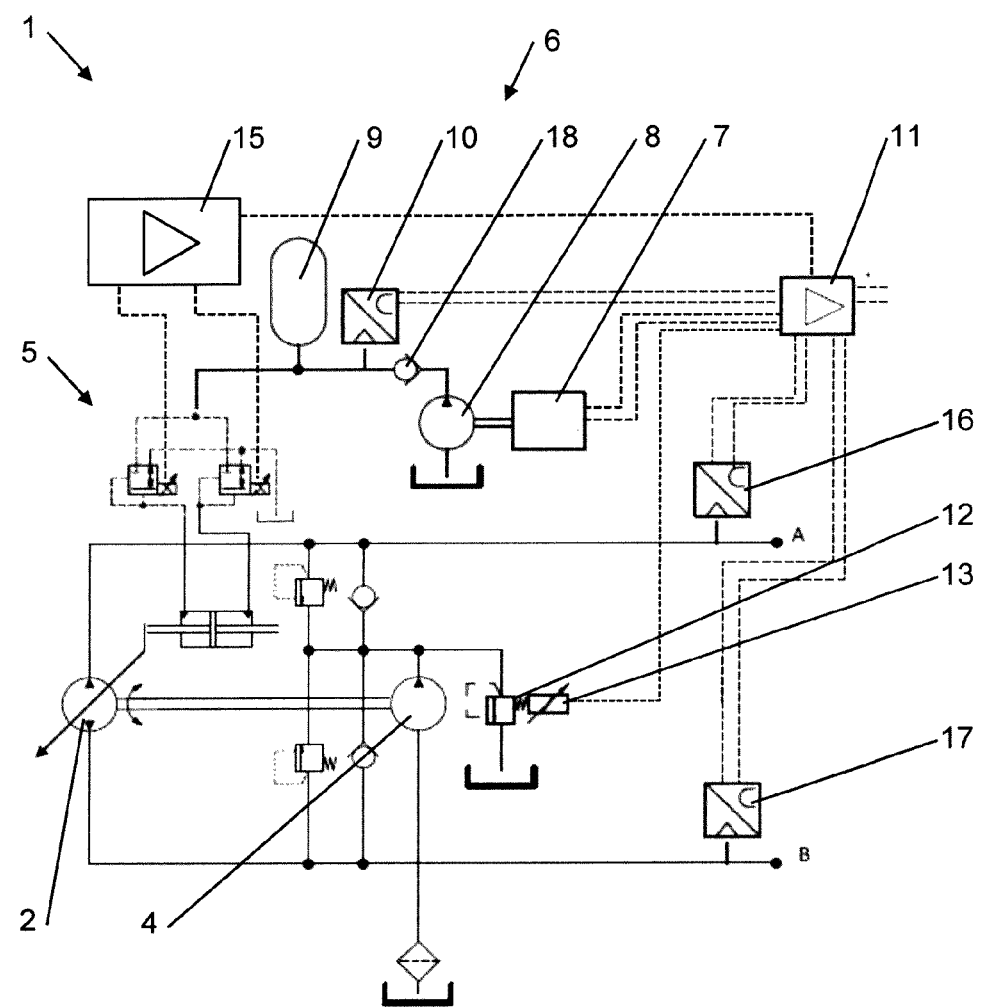

HYDROSTATIC DRIVE HAVING A CLOSED CIRCUIT AND METHOD FOR OPERATING THE DRIVE

This is a National Phase Application filed under 35 U.S.C. 371 as a national stage of PCT/EP2017/000701, filed Jun. 16, 2017, an application claiming the benefit of European Application No. 16001439.5, filed Jun. 28, 2016, the content of each of which is hereby incorporated by reference in its entirety.

The invention relates to a hydrostatic drive having a closed circuit according to the preamble of the first claim. Such drives preferably contain axial-piston pumps with an electro-hydraulically switched or proportionally operating adjustment, but also pumps with hydraulic remote adjustment and pumps with electronic automotive control. In many applications it is not only the pump but also an associated hydrostatic motor that is adjusted.

STATE OF THE ART

Drives with a closed circuit require a liquid feed by means of a feed pump. The supply pressure is then usually set to a fixed pressure, which also simultaneously provides for the withdrawal of actuating energy for pump adjustment; a supply pressure of 20-30 bar is thus usually specified for the pump adjustment. The pump adjustment can be reliably actuated with this supply pressure. But this also requires the supply pressure for the closed circuit to be held constant at this pressure level; the required driving power for the feed pump is defined as the product of the feed rate times the supply pressure, which can however be lower if the control pressure is not inferred from the feed circuit.

A switchable reduction of the supply pressure along with a simultaneous reduction of the supply of control oil as deduced from the supply pressure, which reduces the possible swinging out of the pump against the centering spring, is known from the publication DE 10 2012 005 824 A1.

Section 0007 of the document concerning the invention of a supply pressure decrease according to EP 2 503 195 A1 shows the mechanical decoupling of the feed pump from the hydraulic pump, which the present invention does not require. The proportional pressure regulation of the supply pressure represented in Sections 0009 and 0050 to 0052 serves the purpose of regulating the withdrawal quantity depending on the cooling demand in the closed circuit. In accordance with FIG. 8, this invention provides for a coupling of the supply pressure to the feed pressure without the possibility of storing the actuating energy in a hydraulic accumulator or generating the actuating energy by means of an electric pump.

The invention according to the publication EP 1 527 939 B2 has a hydraulic accumulator (51) in the control oil circuit, which is loaded by an accumulator loading valve (52), which is fed by the feeding pump circuit and provides actuating energy for notching up the hydraulically venting brakes at the displacement motors. However the invention does not serve the purpose of lowering the supply pressure while simultaneously maintaining the supply of control oil.

Task:

The present invention describes a drive, which enables a decrease of the supply pressure provided by the feed pump, and simultaneously produces a demand-driven supply of the adjustment unit regarding the pressure and the feed rate.

Solution

This task is accomplished by way of the characteristic features of main claim; further claims implement the invention in greater detail and describe methods for operating the drive.

The reduction of the supply pressure is produced in a known way by means of the adjustable supply pressure limiting valve.

So that the pressure of the supply of the adjustment unit of the drive is not also reduced, the supply unit contains an electrohydraulic motor-pump assembly, which preferably provides for a variable pressure and a variable delivery rate.

The delivery rate is then limited by the speed of the auxiliary pump and of the electric motor and the pressure is, e.g., limited by the torque of the electric motor.

For the pressure and the delivery rate to meet the demand as needed, an electrical auxiliary control determines the need for the adjustment unit from electrical signals received either from a primary drive control or from the adjustment unit itself.

The speed and the torque of the electric motor are set according to the determined demand.

To keep the power consumption of the electric motor low, the outlet of the feed pump is advantageously connected to the inlet of the auxiliary pump, because hydraulic power can be supplied more economically in vehicles and driving machines than electrical power.

Advantageously the supply pressure limiting valve for adjusting the supply pressure of the aforesaid electrical auxiliary control is adjusted preferably by means of an electrohydraulic actuator.

To be able to handle short term, particularly high hydraulic performance requirements of the adjustment unit, the aforesaid supply unit is advantageously supplemented by a hydraulic accumulator, which is filled by the auxiliary pump via a check valve.

To not only make it possible to control but also to regulate the pressure of the supply unit, the supply unit is advantageously supplemented by an electrohydraulic pressure transducer. This makes measurement of the pressure and demand-driven adjustment of the speed and the torque of the electric motor in the closed loop circuit possible.

If the electrical auxiliary control is to also adjust the supply pressure valve, it is of advantage for this auxiliary control to receive information about the pressures in the working lines of the drive, so that it can determine the load on the drive and thus the supply pressure required based on the aforesaid pressures. The supply pressure requirement can also be described as dependent on the speed of the hydrostatic motor. In this event, the signals from the drive control allow for an estimation and for consideration of the speed.

If the supply pressure demand and the power demand of the supply unit are low, the supply pressure is adjusted by the auxiliary control to a lower value and the power consumption of the feed pump is thus reduced, which particularly improves the efficiency of the hydrostatic drive unit in a partial load operation.

Application

Hydrostatic drives of the kind described are, for example, used in self-propelled machines.

IMAGES

FIG. 1 shows the circuit diagram of the hydrostatic drive unit of this invention.

EXEMPLARY IMPLEMENTATION

A hydrostatic drive (1) according to FIG. 1, consists of at least one variable flow pump (2), one or more hydraulic motors (not shown), a feed pump (4), a supply pressure limiting valve (12), an adjustment unit (5) and the drive control (15) driving the adjustment unit.

The adjustment unit (5) is supplied with hydraulic energy by an electrohydraulic supply unit (6) and the supply unit (6) consists of an electric motor (7) and an auxiliary pump (8) coupled thereto, whose outlet is connected with the adjustment unit (5).

In an alternative embodiment, the inlet of the auxiliary pump (8) is connected to the outlet of the feed pump (4).

The outlet of the auxiliary pump (8) is connected to the adjustment unit (5) and to a hydropneumatic accumulator (9) advantageously via a check valve (18). The auxiliary pump (8) is preferably also connected to an electrohydraulic pressure sensor (10), wherein the pressure sensor (10) sends its electrical signal to an electrical auxiliary control (11) and wherein the electrical auxiliary control (11) turns the electric motor (7) on and off or is controlling its speed and/or its torque.

The supply pressure limiting valve (12) is preferably configured as an electrohydraulic valve, wherein an electrical actuator (13) adjusts the supply pressure limiting valve and wherein the electrical actuator is electrically connected to the auxiliary control (11).

The supply pressure limiting valve (12) is preferably furthermore configured as a proportionally operating electrohydraulic valve, wherein the auxiliary control (11) emits a proportional electrical signal to the electrical actuator (13), wherein the electrical actuator (13) is configured so that the nominal value of the supply pressure is decreased with increasing electric current and the nominal value of the supply pressure is increased with decreasing electric current. This ensures that the supply pressure is at its safe maximum value in the event of a failure of the electric supply.

The outlets for the operating pressures of the variable flow pump (2) are advantageously connected to the operating pressure sensors (16, 17), wherein the signals from the operating pressure sensors are sent to the auxiliary control (11) and/or to the drive control (15).

The outlet of the auxiliary pump (8) is, if needed, also connected to additional electrohydraulic or hydromechanical devices so as to supply them with hydraulic energy.

These devices are, for example, electrohydraulic valves, which precontrol other valves or control couplings or cylinders.

For operation of the hydrostatic drive of this invention, the electrical auxiliary control (11) is configured as a program-controlled control system and controls the electric motor (7) so that the auxiliary pump (8) connected to the electric motor (7) supplies the adjustment unit (5) with hydraulic energy as demanded, wherein the demand is determined by way of electrical signals from the adjustment unit (5), via a drive control (15) overriding an auxiliary control (11) or via signals from the operating pressure sensors (16, 17).

The auxiliary control (11) preferably controls the electric motor (7) connected to the auxiliary pump (8) so that it is switched on or off depending on the electrical signal from the pressure sensor (10) or changes its speed in order to control the pressure for the adjustment unit (5) and to thus supply the adjustment unit with hydraulic energy as demanded.

If required, the auxiliary control (11) triggers the supply pressure limiting valve (12) electrically so that, in the event the power requirement of the adjustment unit (5) increases, the supply pressure and concomitantly the inlet pressure of the auxiliary pump (8) are increased in view of the supply pressure demand of the variable flow pump (2), wherein the power demand of the adjustment unit (5) is determined from the signals received from the adjustment unit and from the signal received from the pressure sensor (10) in the auxiliary control (11) and wherein the supply pressure demand of the variable flow pump (2) is determined from the signals received from the operating pressure sensors (16, 17).

If there is no increase in the power demanded by the adjustment unit, the supply pressure is decreased as much as is permissible, while taking the operating situation of the hydrostatic drive as determined from the signals from the operating pressure sensors and from signals from the drive control (15) into consideration. This decrease of the supply pressure leads to a considerable reduction of the power dissipation.

LIST OF THE REFERENCE SYMBOLS

1. Hydrostatic drive unit
2. Variable flow pump
4. Feed pump
5. Adjustment unit
6. Supply unit
7. Electric motor
8. Auxiliary pump
9. Hydraulic accumulator
10. Pressure sensor
11. Electrical auxiliary control
12. Supply pressure limiting valve
13. Actuator
15. Drive control
16. Operating pressure sensor
17. Operating pressure sensor
18. Check valve

The invention claimed is:
1. Hydrostatic drive unit, comprising
a variable flow pump,
at least one hydraulic motor,
a feed pump,
an adjustable supply pressure limiting valve,
an adjustment unit, and
a drive control controlling the adjustment unit,
wherein the adjustment unit is supplied with hydraulic energy by an electrohydraulic supply unit,
wherein the supply unit comprises an electric motor, which is controlled by an auxiliary control regarding at least one of its speed and its torque, and an auxiliary pump coupled to the electric motor,
wherein the outlet of the auxiliary pump is connected to the adjustment unit,
wherein the supply pressure limiting valve is configured as an electrohydraulic valve,
wherein an electrical actuator adjusts the supply pressure limiting valve, and
wherein the electrical actuator is electrically connected to the auxiliary control.

2. Hydrostatic drive unit according to claim 1, wherein the inlet of the auxiliary pump is connected to the outlet of the feed pump.

3. Hydrostatic drive unit according to claim 1, wherein the outlet of the auxiliary pump is connected to the adjustment unit and to a hydraulic accumulator via a check valve.

4. Hydrostatic drive unit according to claim 3, wherein at least one of the auxiliary pump and the hydraulic accumulator is also connected to an electrohydraulic pressure sensor, wherein the pressure sensor sends its electrical signal to the electrical auxiliary control and wherein the electrical auxiliary control turns the electric motor on or off.

5. Hydrostatic drive unit according to claim 3, wherein at least one of the auxiliary pump and the hydraulic accumulator is also connected to an electrohydraulic pressure sensor, wherein the pressure sensor sends its electrical signal to the electrical auxiliary control and wherein the electrical auxiliary control controls its speed.

6. Hydrostatic drive unit according to claim 1, wherein the supply pressure limiting valve is configured as a proportionally operating electrohydraulic valve, wherein the auxiliary control emits a proportional electrical signal to the electrical actuator.

7. Hydrostatic drive unit according to claim 1, wherein the electrical actuator is configured so that the nominal value of the supply pressure is decreased with increasing electric current and the nominal value of the supply pressure is increased with decreasing electric current.

8. Hydrostatic drive unit according to claim 1, wherein the outlets for the operating pressures of the variable flow pump are connected to operating pressure sensors, wherein the signals from the operating pressure sensors are sent to at least one of the auxiliary control and the drive control.

9. Hydrostatic drive unit according to claim 1, wherein the outlet from the auxiliary pump is also connected to at least one of additional electrohydraulic and hydromechanical devices in order to supply them with hydraulic energy.

10. Hydrostatic drive unit according to claim 1, wherein the outlet of the auxiliary pump is connected to electrohydraulic valves, wherein the electrohydraulic valves control an item selected from the group comprising other valves, couplings and cylinders.

11. Hydrostatic drive unit according to claim 1, wherein the auxiliary pump is connected to an electrohydraulic pressure sensor.

12. Hydrostatic drive unit according to claim 1, wherein the electrical auxiliary control is configured as a programmed control which controls the electric motor in such a way that the auxiliary pump connected to the electric motor supplies the adjustment unit with hydraulic energy as needed, wherein the need is determined from at least one of electrical signals from the adjustment unit, electrical signals of the drive control overriding the auxiliary control and from electrical signals from operating pressure sensors connected to the outlets of the variable flow pump.

13. Hydrostatic drive unit according to claim 1, wherein the auxiliary control switches the electric motor connected with the auxiliary pump on or off depending on an electrical signal from a pressure sensor connected to the auxiliary pump.

14. Hydrostatic drive unit according to claim 1, wherein the auxiliary control changes the speed of the electric motor in order to control the pressure for the adjustment unit and to thus supply the adjustment unit with hydraulic energy as demanded.

15. Hydrostatic drive unit according to claim 1, wherein the auxiliary control triggers the supply pressure limiting valve electrically in such a way that, considering the supply pressure requirement of the variable flow pump, the supply pressure and therewith the inlet pressure of the auxiliary pump is raised when the power demand of the adjustment unit is high and the supply pressure is correspondingly decreased when the power demand of the adjustment unit is lower.

16. Hydrostatic drive unit according to claim 1, wherein the power demand of the adjustment unit is determined from signals from the adjustment unit and from the signal from the pressure sensor in the auxiliary control and wherein the supply pressure requirement of the variable flow pump is determined from at least one of the signals from the operating pressure sensors and the drive control.

17. Hydrostatic drive unit according to claim 1, wherein the outlet of the auxiliary pump is connected to the adjustment unit directly.

18. Hydrostatic drive unit according to claim 1, wherein the outlet of the auxiliary pump is connected to the adjustment unit via a check valve.

19. Hydrostatic drive unit, comprising
a variable flow pump,
a hydraulic motor,
a feed pump,
an adjustable supply pressure limiting valve,
an adjustment unit, and
a drive control controlling the adjustment unit,
wherein the adjustment unit is supplied with hydraulic energy by an electrohydraulic supply unit,
wherein the supply unit comprises an electric motor, which is controlled by an auxiliary control regarding at least one of its speed and its torque, and an auxiliary pump coupled to the electric motor,
wherein the outlet of the auxiliary pump is connected to the adjustment unit,
wherein the electrical auxiliary control is configured as a programmed control which controls the electric motor in such a way that the auxiliary pump connected to the electric motor supplies the adjustment unit with hydraulic energy as needed,
wherein the need is determined from at least one of electrical signals from the adjustment unit, electrical signals of the drive control overriding the auxiliary control and from electrical signals of operating pressure sensors connected to the outlets of the variable flow pump.

20. Hydrostatic drive unit, comprising
a variable flow pump,
a hydraulic motor,
a feed pump,
an adjustable supply pressure limiting valve,
an adjustment unit, and
a drive control controlling the adjustment unit,
wherein the adjustment unit is supplied with hydraulic energy by an electrohydraulic supply unit,
wherein the supply unit comprises an electric motor, which is controlled by an auxiliary control regarding at least one of its speed and its torque, and an auxiliary pump coupled to the electric motor,
wherein the outlet of the auxiliary pump is connected to the adjustment unit,
wherein the supply pressure limiting valve is configured as a proportionally operating electrohydraulic valve,
wherein the auxiliary control emits a proportional electrical signal to the electrical actuator, and
wherein the electrical actuator is configured so that the nominal value of the supply pressure is decreased with increasing electric current and the nominal value of the supply pressure is increased with decreasing electric current.

\* \* \* \* \*